United States Patent [19]

Koshiba

[11] Patent Number: 4,778,143
[45] Date of Patent: Oct. 18, 1988

[54] APPARATUS FOR LOCKING MOVABLE TABLE

[75] Inventor: Yoshihito Koshiba, Kyoto, Japan

[73] Assignee: Omron Tateisi Electronics Co., Kyoto, Japan

[21] Appl. No.: 14,195

[22] Filed: Feb. 5, 1987

Related U.S. Application Data

[63] Continuation of Ser. No. 745,177, Jun. 17, 1985, abandoned.

[30] Foreign Application Priority Data

Jun. 15, 1984 [JP] Japan .................................. 59-123501

[51] Int. Cl.4 .............................................. F16M 1/00
[52] U.S. Cl. .................................... 248/678; 108/137
[58] Field of Search ................. 108/137, 138; 248/678

[56] References Cited

FOREIGN PATENT DOCUMENTS 7276 1/1979 Japan ........................................ 52/7
7277 1/1979 Japan ........................................ 52/7

Primary Examiner—Carl D. Friedman
Attorney, Agent, or Firm—Foley & Lardner, Schwartz, Jeffery, Schwaab, Mack, Blumenthal & Evans

[57] ABSTRACT

An apparatus for locking a movable stage onto a stationary base, the stage being moved in the state floating above the base. The apparatus comprises a cap-like vacuum suction plate fixedly combined with the stage and defining a space in cooperation with the stationary base, wherein the space is selectively connected either to an air supply source or to a vacuum source. To move the stage in the floating stage, the space defined below the vacuum suction plate is connected to the air supply source to thereby form an air bearing between the vacuum suction plate and the base plate, whereby a gap and parallelism is maintained therebetween. Upon completion of positioning of the stage, the space is connected to the vacuum source so that the vacuum suction plate is locked onto the stationary base under the suction effect brought about by evacuation of the space.

8 Claims, 2 Drawing Sheets

APPARATUS FOR LOCKING MOVABLE TABLE

This application is a continuation of application Ser. No. 745,177, filed June 17, 1985, now abandoned (3-4-88).

BACKGROUND OF THE INVENTION

1. Field of the Invention

The present invention relates to an apparatus for fixing or locking a movable stage which is to be moved in the state floating above a stationary base or platform.

2. Description of the Prior Art

A movable stage or carriage locking apparatus which allows a movable stage to be moved in the state floating above a stationary base and subsequently to be fixed or locked at a predetermined position is known. Reference may be made to an article titled "A Precise Positioning Mechanism for Aerostatically Floatable Stage" contained in "Collection of Lectures at Congress of Japan Precision Machinery Association" No. 323, (1982, Spring) p. 207.

For having a better understanding of the present invention, description will first be made about a hitherto known apparatus. Referring to FIGS. 1 and 2, a table or stage 1 movable in a horizontal direction is combined with a plate-like or flat vacuum suction cap 2b provided with an air passage 2d connected to a pressurized air supply source 10 by means of an elastic member 2 provided with elastic connecting arms 2a so that the flat vacuum suction cap 2b is vertically movable and swingable relative to the stage 1. The vacuum suction plate or cap 2b is disposed in opposition to a stationary fixing base 5. For movement of the stage 1, the vacuum suction cap 2b is caused to move away from the stationary base 5 under resilience of the elastic connecting arms 2a. On the other hand, when the stage 1 is to be positioned fixedly, a conduit 6 connected to the air passage 2d is operatively connected to a vacuum source 8 under the control of an electrically controlled valve 7, as the result of which the air present under the vacuum suction cap 2b is discharged through the passage 2d, whereby the vacuum suction cap 2b is tightly locked to the stationary base 5 under action of the vacuum. In order to assure the movement of the vacuum suction cap or plate 2b in parallel with the stationary base or platform 5, a plurality of adjusting screws 11 arranged in through-holes 2e formed in the elastic member 2 and having respective internal threads are provided at appropriate positions. Through rotation of the adjusting screws 11 whose tips can bear against the flat top surface of the vacuum suction cap 2b, a gap 4 between the vacuum suction cap 2 and the stationary base 5 is adjusted in the unlocked state of the vacuum suction cap 2b. In practice, however, since a limitation is imposed on the pitch of the thread of the adjusting screw 11, difficulty will be encountered in finely adjusting the gap to be parallel between the vacuum suction cap 2b and the stationary base 5 on the order of microns in the unlocked state of the former. Further, in consideration of the fact that the adjustment of interest has to be performed by manipulating the adjusting screws 11 individually in the state in which the vacuum lock assembly including the elastic member 2, the vacuum suction cap 2b, the adjusting screws 11 and others are installed on the stationary base or platform 5, the adjusting operation is very troublesome. Besides, it is difficult to perform the adjustment with a high accuracy. It should further be mentioned that the vacuum lock assembly which is adapted to be employed in a machine requiring a higher positioning accuracy must be so constructed that the gap 4 between the vacuum suction plate or cap 2b and the stationary base 5 be decreased to a possible minimum in the unlocked state while assuring high parallelism therebetween. The hitherto known apparatus can not meet these requirements, not to speak of its low efficiency in operation and unsatisfactory accuracy of adjustment.

SUMMARY OF THE INVENTION

It is therefore an object of the present invention to provide a movable stage fixing or locking apparatus exhibiting improved efficiency and enhanced accuracy, in which the gap as well as parallelism between the vacuum suction plate and the stationary base in the unlocked state can be automatically finely adjusted on the order of microns without resorting to the use of adjusting screws or the like means to be manually manipulated.

In view of the above object, there is provided according to an aspect of the present invention a movable stage locking or fixing apparatus which comprises a vacuum suction plate means having an air passage connected to an air supply/evacuating means, and elastic means for connecting the vacuum suction plate means to a movable stage in such a manner that the former is vertically movable and swingable relative to the latter, wherein upon movement of the movable stage or table, an air bearing is formed between a stationary base and the vacuum suction plate means through supply of air from the air supply/evacuating means to thereby maintain a gap and parallelism between the stationary base and the vacuum suction plate. When the positioning has been accomplished, the vacuum suction plate is fixedly locked onto the stationary base through air evacuating function of the air supply/evacuating means. By virtue of the structure taught by the invention, the adjusting procedure by means of adjusting screw as required in the case of the prior art apparatus is reendered utterly unnecessary. The gap as well as parallelism can be automatically established, to a great advantage from the standpoint of manufacturing cost and requisite positional accuracy. Further, the vacuum suction plate can be floated at a constant height, assuring a constant response, representing another advantage.

The above and other objects, features and advantages of the invention will be more apparent upon consideration of the following description of the preferred embodiment of the invention taken, only by way of example, in conjunction with the accompanying drawings.

DESCRIPTION OF THE PREFERRED EMBODIMENT

Now, the invention will be described in detail in conjunction with an exemplary embodiment thereof.

Figure 1:
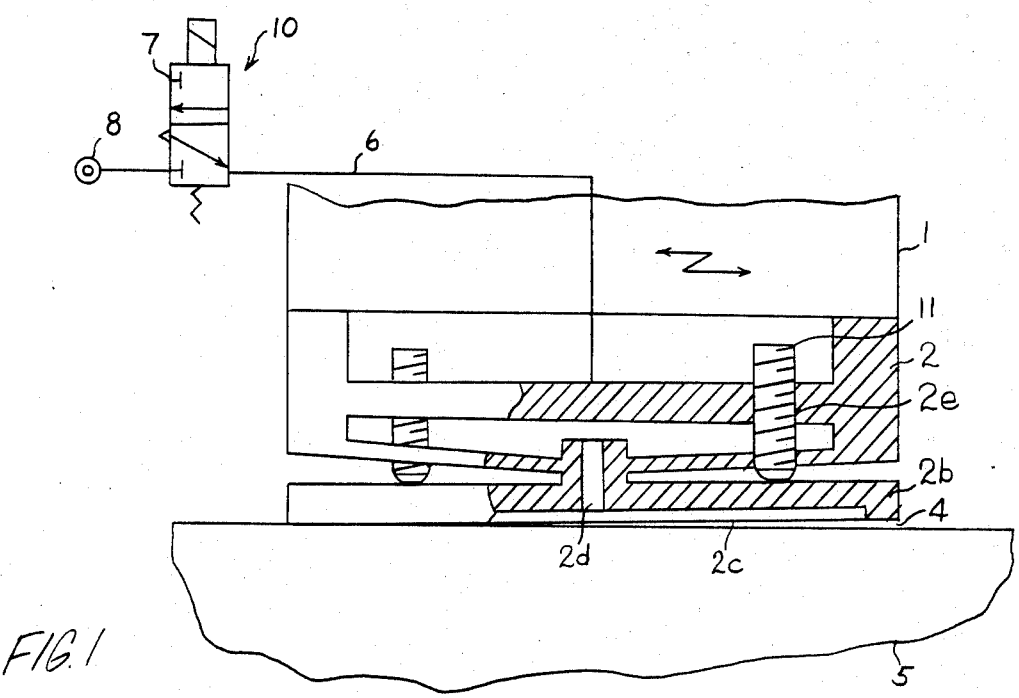
FIG. 1 is a partially sectioned elevational view showing a hitherto known movable stage locking apparatus in an unlocked state.
Figure 2:
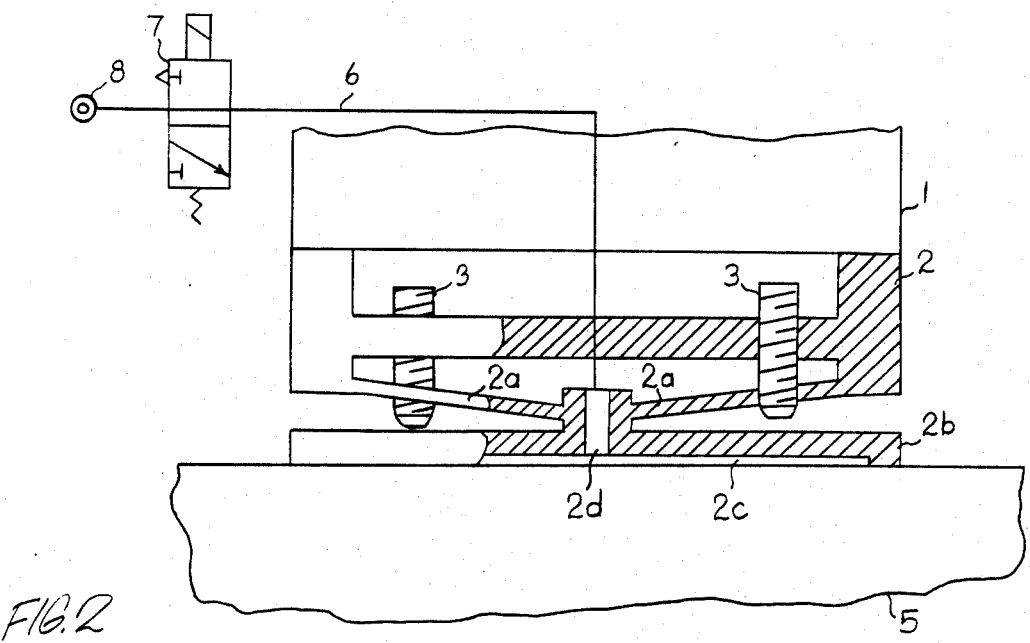
FIG. 2 is a view similar to FIG. 1 and shows the apparatus in a locked or fixed state.
Figure 3:
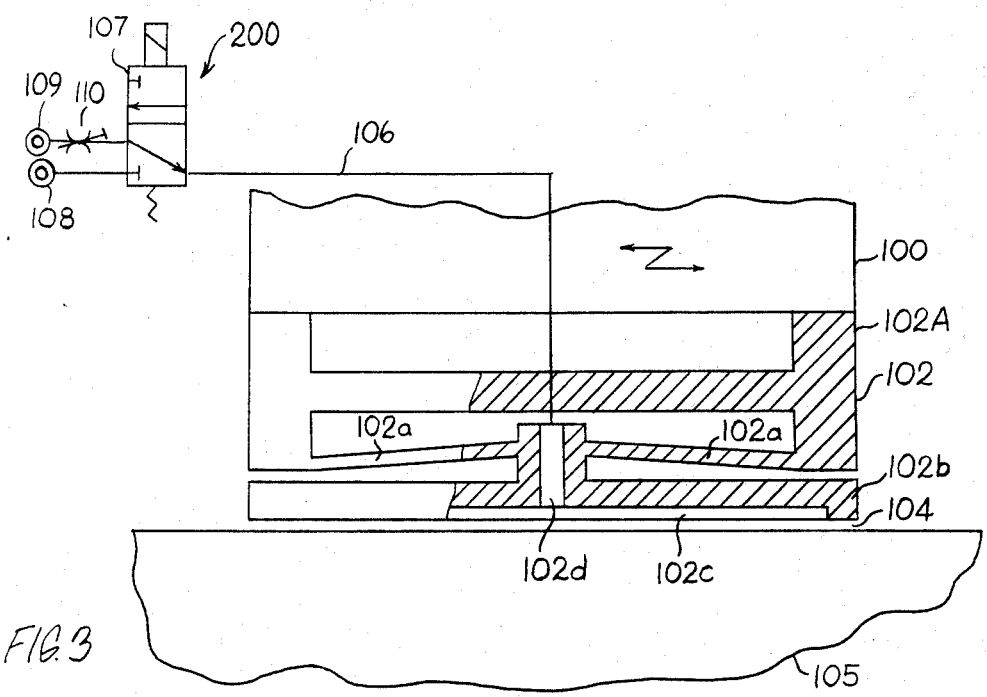
FIG. 3 is a partially sectioned elevational view showing a movable stage or table locking apparatus according to an exemplary embodiment of the invention in an unlocked state.
Figure 4:
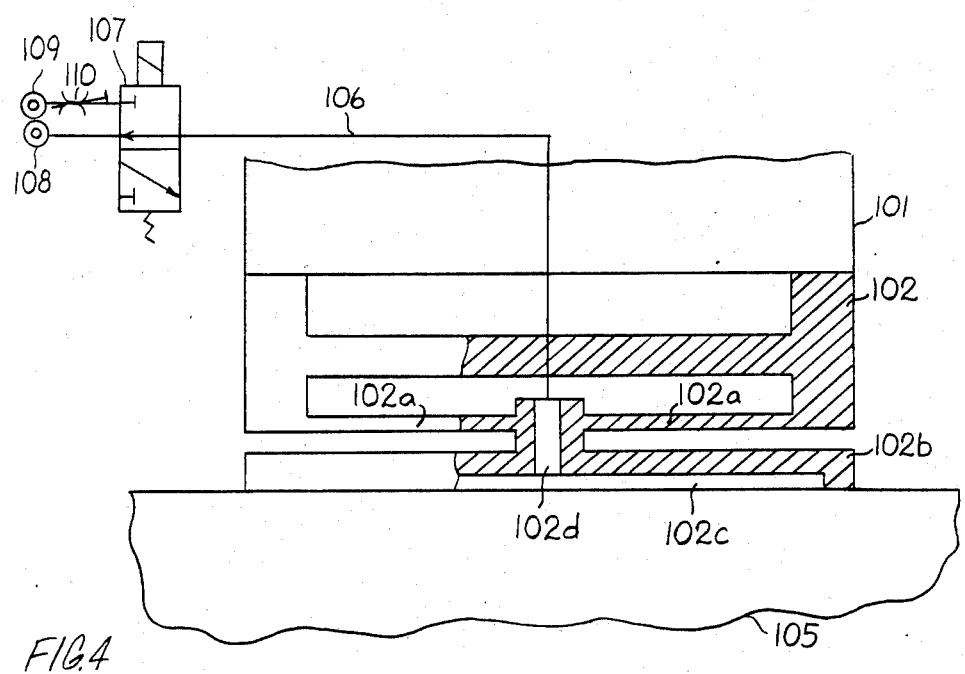
FIG. 4 is a view similar to FIG. 3 and shows the apparatus in a locked state.

FIGS. 3 and 4 show a movable stage or table locking (fixing) apparatus according to an embodiment of the invention in unlocked and locked states, respectively. In the unlocked state, a vacuum suction cap or plate 102*b* is spaced from a stationary base or platform 105, while in the locked state shown in FIG. 4, the plate-like cap 102*b* is fixed under action of vacuum suction.

More specifically, referring to FIG. 3 and 4, a reference numeral 100 denotes a stage of table adapted to be movable in a horizontal direction in the state, 102 denotes an elastic unit made of an elastic material such as rubber or the like and fixedly secured to the bottom surface of the movable stage or table 100. The elastic unit 102 is constituted in an integral structure by a main body 102A, leaf spring elements 102*a* positioned at the lower end of the main body 102A, and the flat cap-like vacuum suction plate 102*b* connected to the main body 102A by means of the leaf spring members 102*a*. The vacuum suction plate 102*b* has an air passage 102*d* formed therein and connected to an air supply-evacuation apparatus 200 through a conduit 106. An air pocket or space 102*c* is defined between the lower surface of the vacuum suction plate 102*b* and a to surface of a stationary base 105. The vacuum suction plate 102*b* is integrally combined with the main body 102A of the elastic unit 102 through the leaf springs 102*a* so that the suction plate 102*b* is vertically movable and swingable. The air supply/evacuation apparatus 200 mentioned above includes a vacuum source 108, a compressed air source 109, a precision needle valve 110 for adjusting the air flow supplied from the compressed air source 109, and an electromagnetic valve 107 for selectively connecting the conduit 106 either to the vacuum source 108 or to the compressed air source 109.

With the structure of the movable stage locking apparatus, when the movable stage or table 100 is to be moved, the conduit 106 is connected to a compressed air source 109 through the electromagnetic valve 107, as is shown in FIG. 3. The air supplied from the compressed air source 109 flows through the needle valve 110, the electromagnetic valve 107, the conduit 106 and the passage 102*d* to enter the air pocket 102*c*. As a result, the vacuum suction plate 102*b* is caused to float above the stationary base 105 to form a gap 104 together with the latter. The air is ejected outwardly through the gap 104. In this manner, there is formed a so-called air bearing pad immediately below the vacuum suction plate 102*b* which in a completely floating state without any contact with the statinary base 105. In this floating state, the cap-like vacuum suction plate 102*b* is maintained constantly at a predetermined height with parallelism being established between the suction plate 102*b* and the statinary base with high accuracy. The width of the gap 4 at that time is determined in dependence on the restoring force of the leaf spring 102*a* urging downwardly the vacuum suction plate 102*b*, air flow or pressure supplied from the compressed air source 109 and other dimensional factors. Consequently, the fine adjustment of the size or width of the gap 104 can be easily accomplished by varying the air flow through regulatin of the needle valve 110. Further, operation efficiency can be improved by virtue of the fact that the parallelism between the vacuum suction plate 102*b* and the stationary base or platform 105 can be constantly maintained with high accuracy independent of the adjustment of the gap 104 while the floating height is also maintained to be constant.

When the vacuum suction plate 100 is to be locked or fixed onto the stationary base 105 upon completion of the positioning of the movable base 100, the electromagnetic valve 107 is so controlled that the conduit 106 is connected to the vacuum source 108, as is shown in FIG. 4, whereupon the air is forcively discharged from the air pocket 102*c* through the passage 102*d* the conduit 106 and the electromagnetic valve 107 to flow into the vacuum source 108. As the consequence, the vacuum suction plate 102*b* is brought into initimate contact with the stationary base 5 under the restoring force of the leaf spring 102*a* and the vacuum now prevailing below the suction plate 102*b*, whereby the plate 102*b* and hence the stage 100 are fixedly locked onto the stationary base 105.

Although only one air passage 102*d* is assumed to be formed in the vacuum suction plate 102*b* in the case of the illustrated embodiment, it will be appreciated that a plurality of such passages may provided without departing from the scope of the invention. Further, the air supply passage and the evacuating passage may be formed separately from each other. The vacuum suction plate may be of any suitable configuration so far as vacuum suction effect can be assured. Further, the main body 102A of the elastice member 102 may be formed separately from the vacuum suction plate 102*b*. Besides, the means for combining the vacuum suction plate 102*b* with the elastic body 102A is not restricted to the leaf springs 102*a*, but other type of elastic member such as coil springs may be employed. In case the adjustment of the gap 104 is allowed to be relatively rough, the precision needle valve 110 disposed between the compressed air source 109 and the electromagnetic valve 107 for regulating the air flow may be spared.

Although the invention has been described in conjunction with the exemplary embodiment shown in the drawings, it should be understood that modifications and variations thereof will readily occur to those skilled in the art without departing from the spirit of the invention.

I claim:

1. Apparatus for locking and unlocking a movable table to a stationary base comprising:
    (a) a resilient member fixed at one end to said table,
    (b) a vertically movable vacuum suction member connected to a lower portion of said resilient member and positioned between said resilient member and said base,
    (c) means for applying suction to said vacuum suction member at a region between said vacuum suction member and said base to thereby secure said vacuum suction member and said table to said base, and
    (d) means for supplying compressed air to said region between said vacuum suction member and said base to create an air bearing between said vacuum suction member and said base to thereby float said table on said base.

2. An apparatus for locking and unlocking a movable table to a stationary base comprising:
    (a) a resilient member fixed at one end thereof to said movable table and operable in a locking state for fixedly contacting said base and further operable in an unlocking state for permitting movement between said table and base;
(b) means operable in said unlocking state for connecting said resilient member to a source of pressurized air to thereby create an air bearing separating said resilient member from said base; and
(c) means operable in said locking state for connecting said resilient member to a source of vacuum to thereby create a partial vacuum between said other end of said resilient member and said base for securing said resilient member to said base.

3. An apparatus according to claim 2, further including a electromagnetically controlled valve for selectively connecting said resilient member either to said pressurized air source or to said vacuum source.

4. An apparatus according to claim 3, further including air flow adjusting means disposed between said electromagnetically controlled valve and said pressurized air source for adjusting a gap between said resilient member and said base.

5. An apparatus according to claim 2, wherein said resilient member comprises a cap-like vacuum suction plate having a peripheral depending skirt for contact with said stationary base in said locking state.

6. An apparatus according to claim 5, wherein said cap-like vacuum suction plate is provided with an air passage substantially at a central portion thereof, said passage being connected to a conduit leading to an outlet of the electromagnetically controlled valve.

7. An apparatus according to claim 5, wherein said resilient member further includes a main body and leaf springs for connecting said vacuum suction plate to said main body which in turn is fixedly secured to said movable table.

8. An apparatus according to claim 7, wherein said main body, said leaf spring and said vacuum suction plate are formed of an elastic material in an integral structure

* * * * *